(12) United States Patent
Tran et al.

(10) Patent No.: US 7,472,487 B2
(45) Date of Patent: Jan. 6, 2009

(54) LEVEL

(75) Inventors: Tho Tran, West Hartford, CT (US); Eric Ranieri, Besancon (FR)

(73) Assignee: The Stanley Works, New Britain, CT (US)

( * ) Notice: Subject to any disclaimer, the term of this patent is extended or adjusted under 35 U.S.C. 154(b) by 164 days.

(21) Appl. No.: 11/441,179

(22) Filed: May 26, 2006

(65) Prior Publication Data
US 2007/0271802 A1    Nov. 29, 2007

(51) Int. Cl.
*G01C 9/28* (2006.01)
(52) U.S. Cl. .......................................... 33/379; 33/381
(58) Field of Classification Search ............ 33/379–390
See application file for complete search history.

(56) References Cited

U.S. PATENT DOCUMENTS

| | | | |
|---|---|---|---|
| 0,523,023 | A | 7/1894 | Traut |
| 0,624,577 | A | 5/1899 | Thompson |
| 1,036,601 | A | 8/1912 | Frank, Sr. |
| 1,105,493 | A | 7/1914 | Collins |
| 1,126,548 | A | 1/1915 | Mayes |
| 1,506,556 | A | 8/1924 | Benedict |
| 1,901,793 | A | 3/1933 | Allen |
| 2,502,235 | A | 3/1950 | Schultes et al. |
| 2,535,791 | A | 12/1950 | Fluke |
| 2,541,880 | A | 2/1951 | McMillan et al. |
| 2,755,561 | A | 7/1956 | Lafosse |
| 2,789,363 | A | 4/1957 | Miley |
| 2,796,673 | A | 6/1957 | Wells |
| 2,814,128 | A | 11/1957 | Hopkinson, Jr. |
| 2,825,144 | A | 3/1958 | Warden, Sr. et al. |
| 2,993,281 | A | 7/1961 | Dock |
| 3,071,863 | A | 1/1963 | MacMillan |
| 3,122,840 | A | 3/1964 | Karstens |
| 3,307,269 | A | 3/1967 | Karstens |
| 3,311,990 | A | 4/1967 | Wright |
| 3,442,024 | A | 5/1969 | Don |
| 3,561,128 | A | 2/1971 | Ostrager |
| 3,563,322 | A | 2/1971 | Young et al. |

(Continued)

FOREIGN PATENT DOCUMENTS

DE          87 11 516         11/1987

(Continued)

OTHER PUBLICATIONS

European Search Report dated Dec. 19, 2007 for corresponding Application No. EP 07 25 2049.

(Continued)

*Primary Examiner*—G. Bradley Bennett
(74) *Attorney, Agent, or Firm*—Pillsbury Winthrop Shaw Pittman LLP

(57) ABSTRACT

A level for measuring, including a level body having a recess, a vial positioned within the recess and secured to the level body, and a resilient member positioned between the vial and the level body to act as a resilient backer to the vial during the positioning of the vial. Also, a method of installing a vial in a level, a method of measuring the angle of an elongated member having a convex, transverse cross-section, and a level for measuring having a vial assembly that is rotatably positioned within the level body.

13 Claims, 13 Drawing Sheets

U.S. PATENT DOCUMENTS

| | | | |
|---|---|---|---|
| 3,568,319 A | 3/1971 | Moll | |
| 3,593,428 A | 7/1971 | Jacoff | |
| 3,673,696 A | 7/1972 | Wasson | |
| 3,824,700 A | 7/1974 | Rutty | |
| 3,826,013 A | 7/1974 | Baher | |
| 3,832,782 A | 9/1974 | Johnson et al. | |
| 3,894,342 A | 7/1975 | Goode | |
| 4,003,134 A | 1/1977 | Adams | |
| 4,011,660 A | 3/1977 | Johnson | |
| 4,419,833 A | 12/1983 | Wright | |
| 4,492,038 A | 1/1985 | Mayes | |
| 4,506,450 A | 3/1985 | Fleming et al. | |
| 4,581,828 A * | 4/1986 | Handler et al. | 33/379 |
| 4,590,682 A | 5/1986 | Koch | |
| 4,593,475 A | 6/1986 | Mayes | |
| 4,667,446 A | 5/1987 | Imahashi | |
| 4,748,744 A | 6/1988 | Turner | |
| 4,829,676 A | 5/1989 | Waldron | |
| 4,843,724 A * | 7/1989 | Greenland | 33/386 |
| 4,860,459 A | 8/1989 | Dengler | |
| 4,908,949 A * | 3/1990 | Jaccard | 33/390 |
| 4,999,921 A | 3/1991 | Bird et al. | |
| 5,001,838 A | 3/1991 | Huxley et al. | |
| 5,020,232 A * | 6/1991 | Whiteford | 33/379 |
| 5,103,569 A | 4/1992 | Leatherwood | |
| 5,111,589 A | 5/1992 | Tate | |
| 5,365,414 A | 11/1994 | Chikada et al. | |
| 5,500,790 A | 3/1996 | Chikada et al. | |
| 5,506,759 A | 4/1996 | Shirai et al. | |
| 5,531,031 A | 7/1996 | Green | |
| 5,586,395 A | 12/1996 | Malczewski | |
| 5,588,217 A * | 12/1996 | Lindner et al. | 33/379 |
| D392,198 S | 3/1998 | Doust | |
| 5,755,037 A | 5/1998 | Stevens | |
| 6,012,229 A | 1/2000 | Shiao | |
| 6,148,530 A * | 11/2000 | Jacoff et al. | 33/377 |
| 6,360,446 B1 | 3/2002 | Bijazwat et al. | |
| 6,434,842 B1 | 8/2002 | Cruz | |
| D469,370 S | 1/2003 | Gruetzmacher et al. | |
| 6,568,095 B2 | 5/2003 | Snyder | |
| 6,675,490 B1 | 1/2004 | Krehel et al. | |
| 6,760,975 B1 | 7/2004 | Schmidt | |
| 6,792,686 B2 | 9/2004 | Krehel et al. | |
| D497,316 S | 10/2004 | Kun, Sr. et al. | |
| D498,198 S | 11/2004 | Levinson et al. | |
| 6,839,973 B1 | 1/2005 | Woodward | |
| 6,874,240 B1 | 4/2005 | Cruttenden | |
| D513,198 S | 12/2005 | Levinson | |
| 2002/0073561 A1 * | 6/2002 | Liao | 33/451 |
| 2003/0005590 A1 | 1/2003 | Snyder | |
| 2003/0005592 A1 | 1/2003 | Wang | |
| 2003/0079357 A1 | 5/2003 | Liao | |
| 2003/0211317 A1 * | 11/2003 | Sheridan et al. | 428/343 |
| 2004/0143981 A1 | 7/2004 | Krehel et al. | |
| 2005/0160610 A1 | 7/2005 | Scheyer | |
| 2005/0229412 A1 | 10/2005 | Foran | |
| 2005/0229415 A1 | 10/2005 | Kim | |
| 2005/0229416 A1 | 10/2005 | Kim | |

FOREIGN PATENT DOCUMENTS

| | | |
|---|---|---|
| GB | 484937 | 5/1938 |
| GB | 836728 | 6/1960 |
| GB | 1049167 | 11/1966 |
| GB | 2 001 174 A | 1/1979 |
| GB | 2 348 953 A | 10/2000 |
| WO | 2005/064272 A1 | 7/2005 |

OTHER PUBLICATIONS

Partial European Search Report dated Sep. 13, 2007 for corresponding EP Application No. 07 25 2049, 4 pp.

* cited by examiner

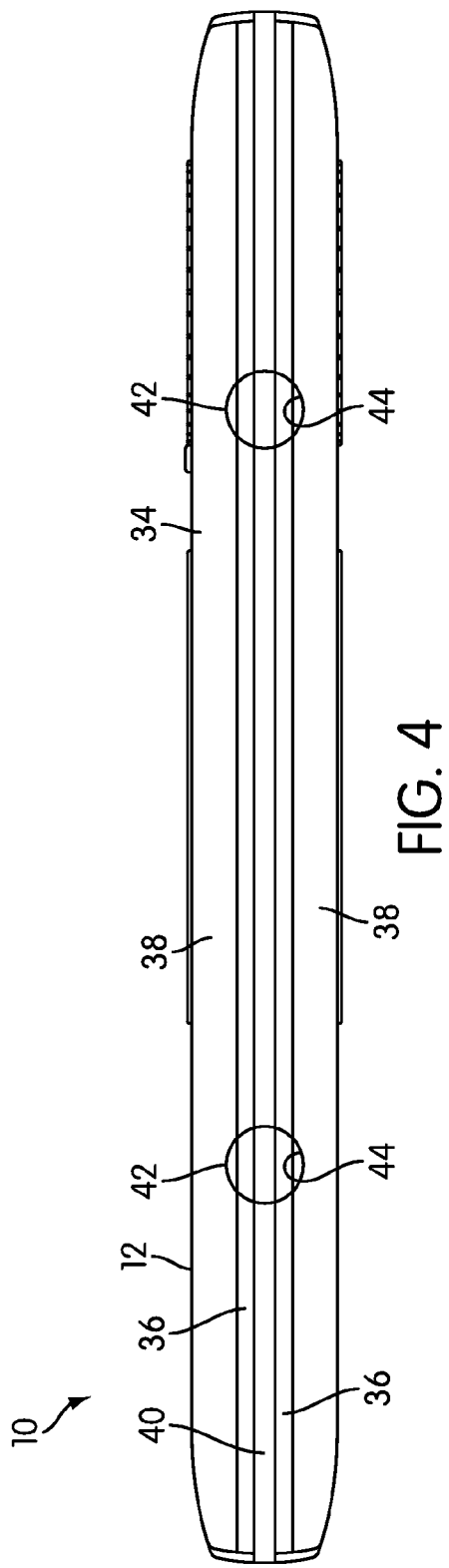
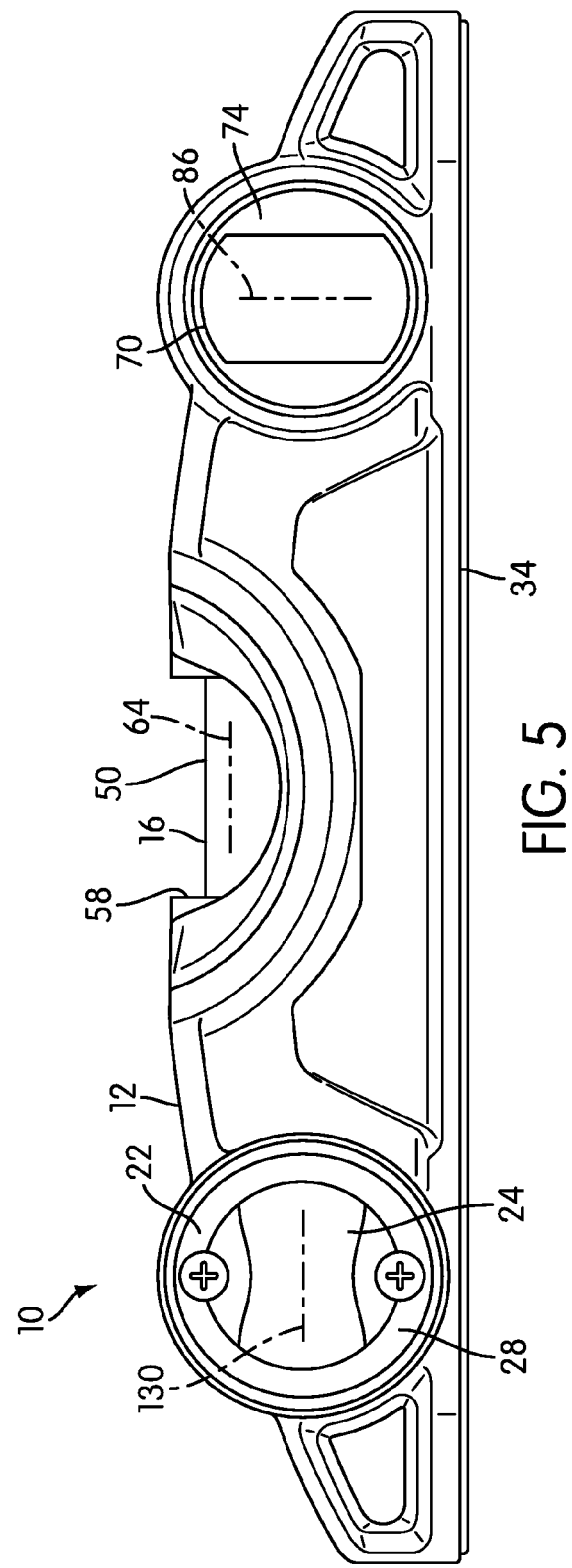

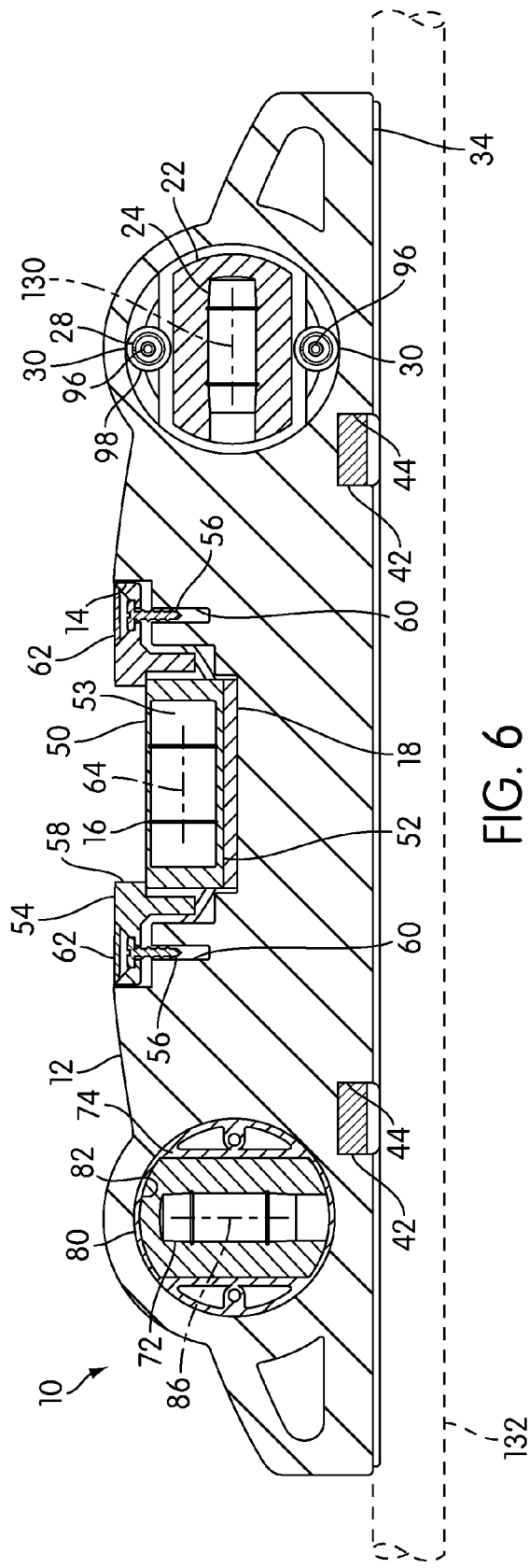
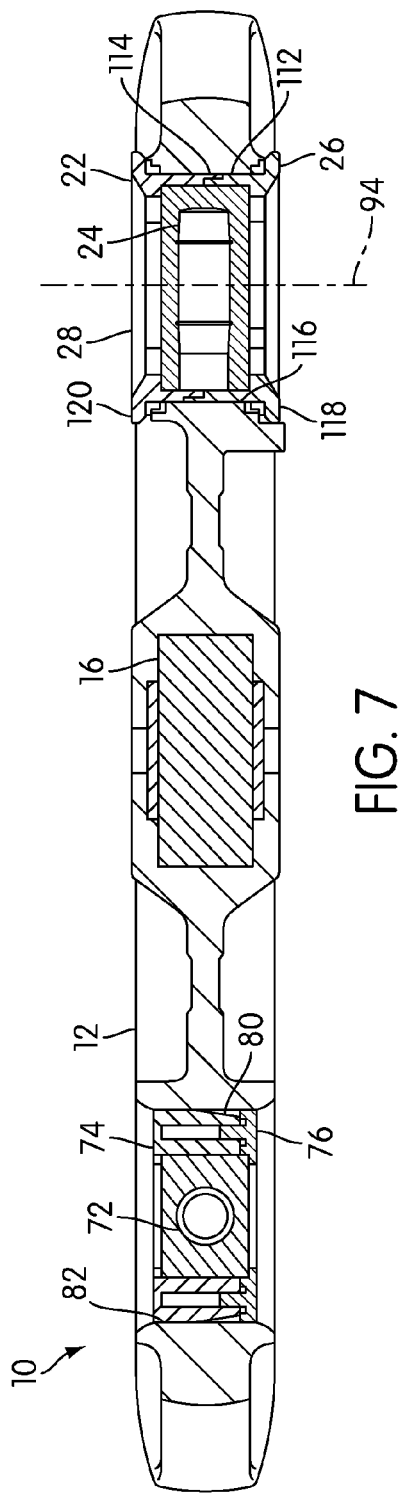

LEVEL

BACKGROUND

1. Field of the Invention

The present invention relates to a level and to methods of making and using a level. In particular, embodiments of the present invention relate to apparatus and methods relating to a level with a vial for measuring.

2. Background of the Related Art

Levels, also called bubble levels or spirit levels, are instruments used for setting horizontal or vertical surfaces. The level typically includes a sealed vial containing an entrapped air bubble floating in a liquid. The flatness of a horizontal or vertical surface may be determined by placing the operating planar surface of the level on or against the surface and viewing the position of the bubble against the predetermined graduated marks on the vial.

SUMMARY

One aspect of the invention relates to a level for measuring, comprising: a level body having a recess; a vial positioned within the recess and secured to the level body; and a resilient foam positioned between the vial and the level body to act as a resilient support to the vial.

Another aspect of the invention relates to a method of installing a vial in a level, comprising: positioning a resilient member in an opening in the level; positioning the vial within the opening while forcing the vial against the resilient member; adjusting the position of the vial within the opening wherein the resilient member resiliently accommodates the adjusting; and securing the vial in the adjusted position.

Another aspect of the invention relates to a method of measuring the angle of an elongated member having a convex, transverse cross-section, the method comprising positioning a measuring level against the elongated member such that the convex, transverse cross-section of the elongated member is positioned within a recess in the level that has a generally concave cross-section; and rotating a vial, which is attached to the level, about an axis to determine the angular configuration of the elongated member relative to a predetermined surface.

Another aspect of the invention relates to a level for measuring, comprising a level body having an opening; a vial assembly, including a vial positioned between two carriers that are secured to each other, the vial assembly further including a resilient member positioned between the two carriers and applying a force in the direction for separating the carriers from each other, the vial assembly being rotatably positioned within the opening to be rotatable relative to the level body, and the carriers being separated by the resilient member sufficiently to provide a predetermined level of friction between the vial assembly and the level body when the vial assembly is rotated relative to the level body.

Another aspect of the invention relates to a level for measuring, including a level body having an opening; a resilient member positioned in the opening; a vial positioned within the opening and forced against the resilient member by an adjustable device that is configured to adjust the position of the vial within the opening while the resilient member contacts the vial and resiliently accommodates the adjusting; and a securing element configured to secure the vial in the adjusted position relative to the level body.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF DRAWINGS

The invention is illustrated with drawings which represent one of the embodiment in which the present invention may be practiced. It is to be understood that the principles and features of the present invention may be embodied in variant embodiments incorporating changes and adaptations by those skilled in the art. Accordingly the invention is not deemed limited to the exact construction shown. All modifications and equivalents are intended to be within the scope of the present invention. In the accompanying drawings:

FIG. 4 is a bottom view of the level of FIG. 1;

FIG. 5 is a rear side view of the level of FIG. 1;

FIG. 6 is a cross-sectional view of the level of FIG. 1 taken along line 6-6 in FIG. 1;

FIG. 7 is a cross-sectional view of the level of FIG. 1 taken along line 7-7 in FIG. 5;

DETAILED DESCRIPTION OF THE ILLUSTRATED EMBODIMENTS

Figure 1:
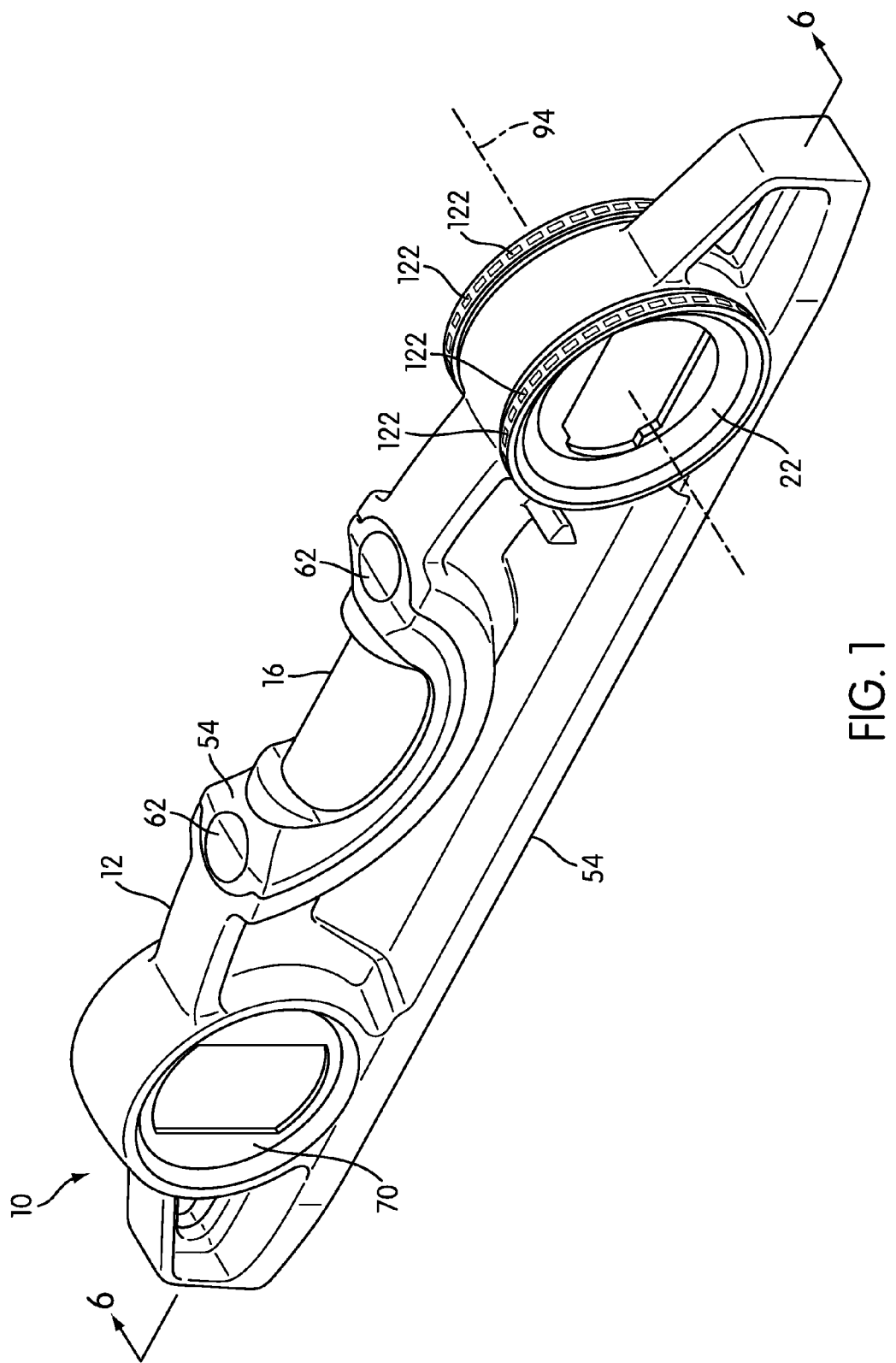
FIG. 1 is a perspective view of a level in accordance with one embodiment of the present invention.
Figure 2:
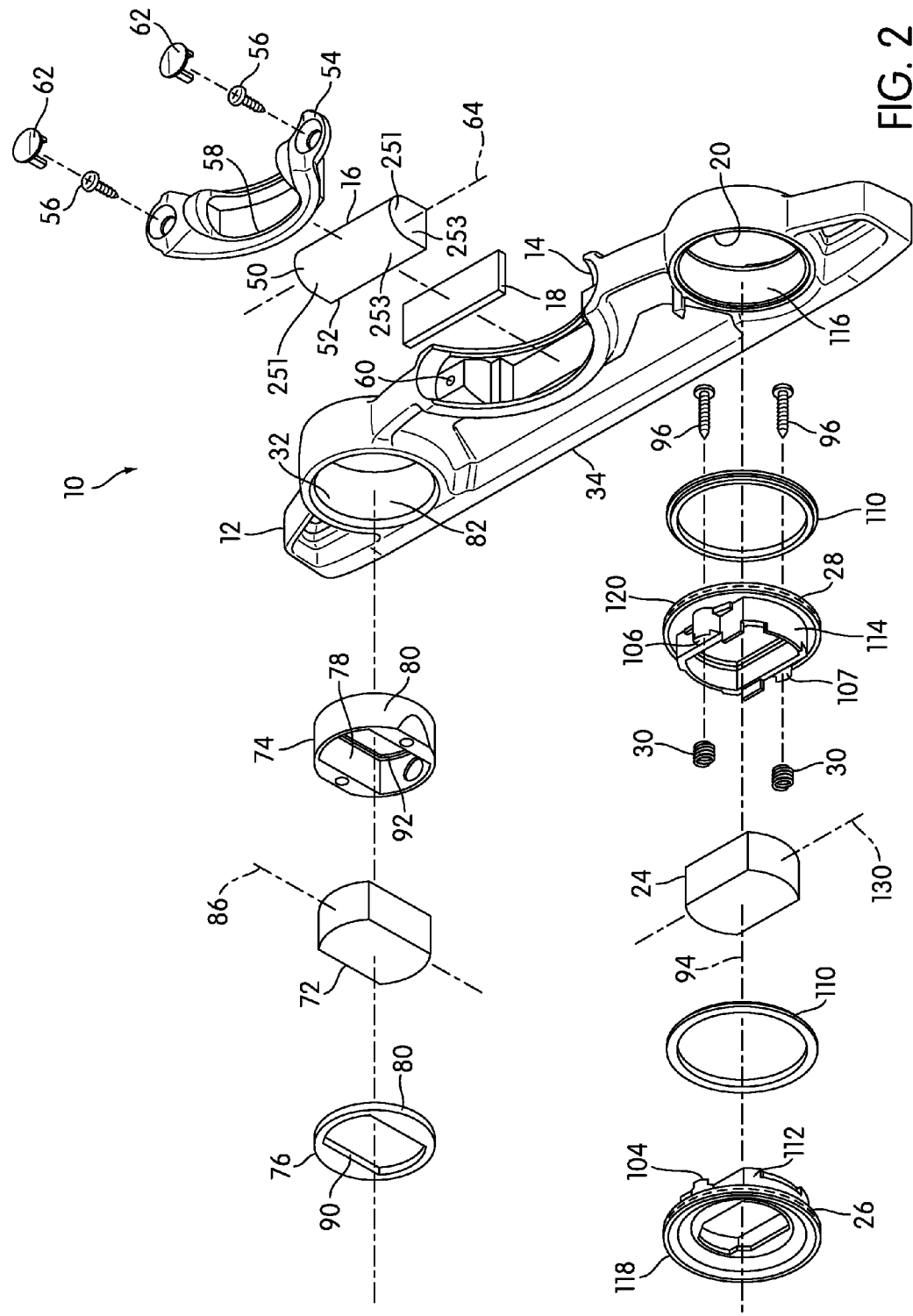
FIG. 2 is an exploded view of the level of FIG. 1.
Figure 3:
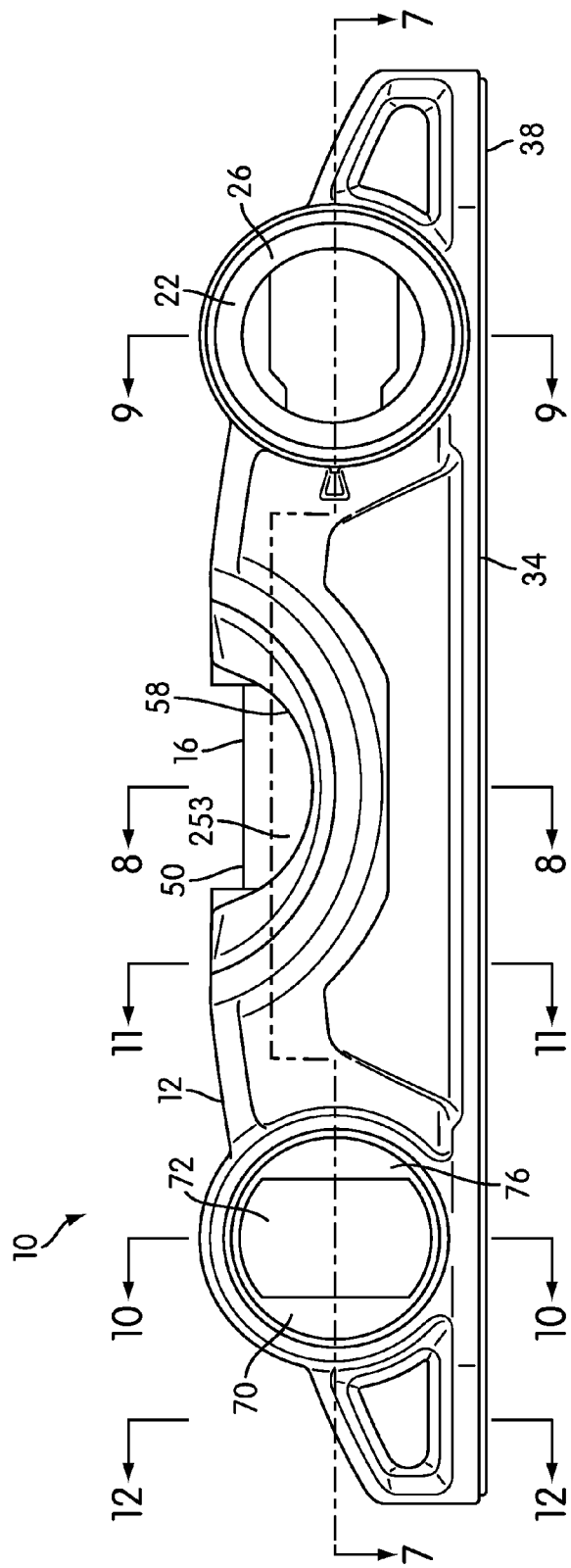
FIG. 3 is a front side view of the level of FIG. 1.

FIGS. 1-24 illustrate one embodiment of a level 10 in accordance with the subject application. The assembled level 10 is illustrated in FIGS. 1-12, while FIGS. 13-24 illustrate the level body 12 in isolation.

Generally, the level 10 of the subject application has one or more vials for measuring a surface relative to predetermined surface, such as a horizontal surface. For example, the illustrated level include a top recess 14 in the level body 12 with a top vial 16 that is positioned within the recess 14 and that is rigidly secured to the level body 12. Within the recess 14, a resilient material 18 is positioned between the vial 16 and the level body 12 to act as a resilient backer to the vial 16. The level 10 may also have one or more vials positioned on the sides of the level 10. For example, as illustrated, the level body 12 includes a side opening 20 with a side vial assembly 22 rotatably positioned therein. The vial assembly 22 includes a side vial 24 positioned between two carriers 26, 28, which are secured to each other. The vial assembly 22 may further include a resilient member 30 that is positioned between the two carriers 26, 28 so that the resilient member 30 may apply a force that acts to separate the two carriers 26 and 28 from each other. The vial assembly 22 may be rotatably positioned within the opening 20 to be rotatable relative to the level body 12, and the carriers 26 and 28 may be sufficiently separated by the resilient member 30 to provide a predetermined level of friction between the vial assembly 22 and the level body 12 while selectively rotating the vial assembly 22 relative to the level body 12.

Figure 8:
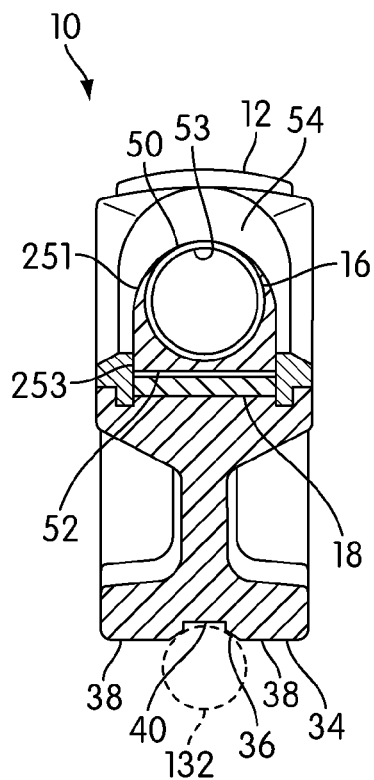
FIG. 8 is a cross-sectional view of the level of FIG. 1 taken along line 8-8 in FIG. 5.
Figure 9:
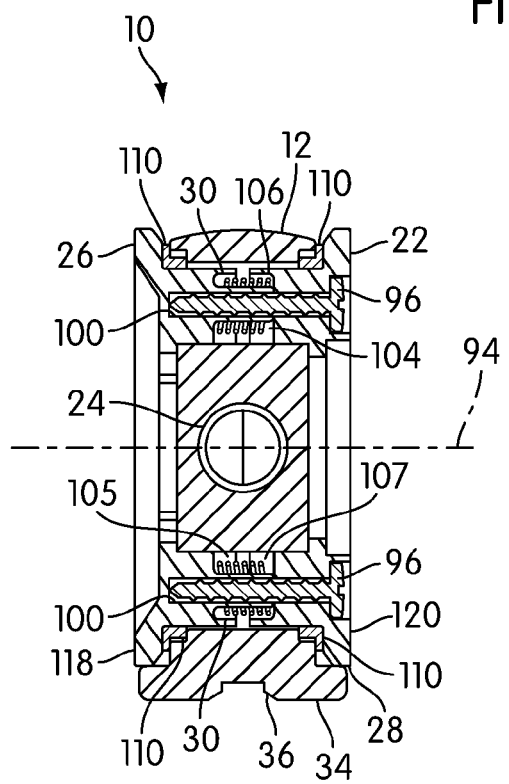
FIG. 9 is a cross-sectional view of the level of FIG. 1 taken along line 9-9 in FIG. 5.
Figure 10:
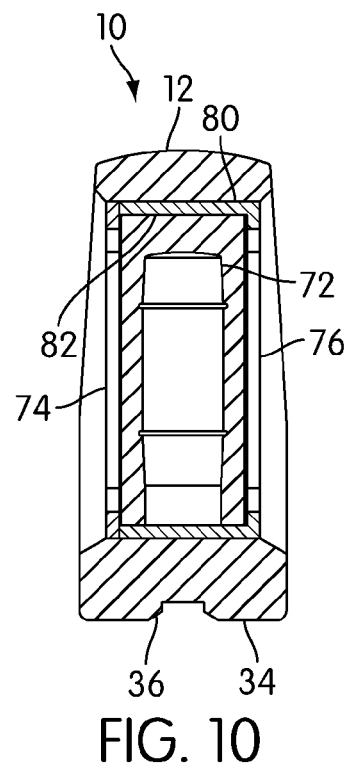
FIG. 10 is a cross-sectional view of the level of FIG. 1 taken along line 10-10 in FIG. 5.
Figure 11:
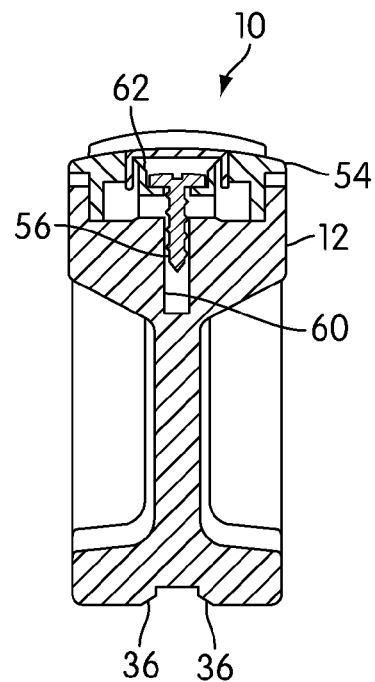
FIG. 11 is a cross-sectional view of the level of FIG. 1 taken along line 11-11 in FIG. 5.
Figure 12:
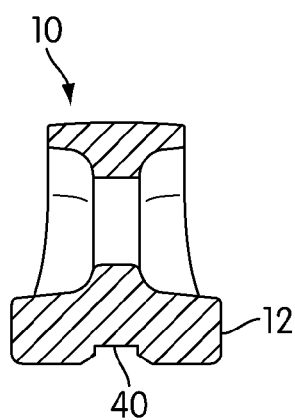
FIG. 12 is a cross-sectional view of the level of FIG. 1 taken along line 12-12 in FIG. 5.
Figure 13:
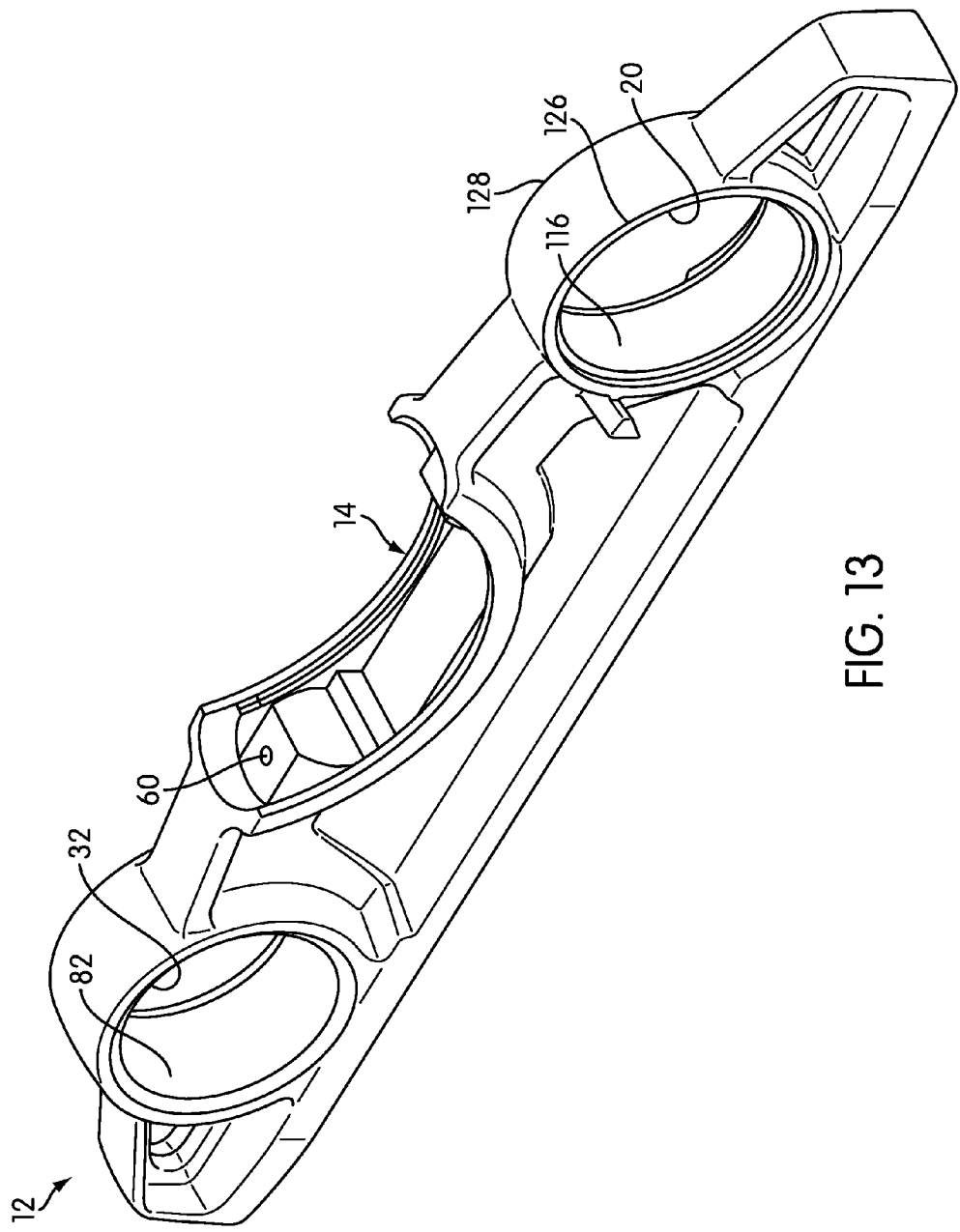
FIG. 13 is a perspective view of a level of FIG. 1 without vials.
Figure 14:
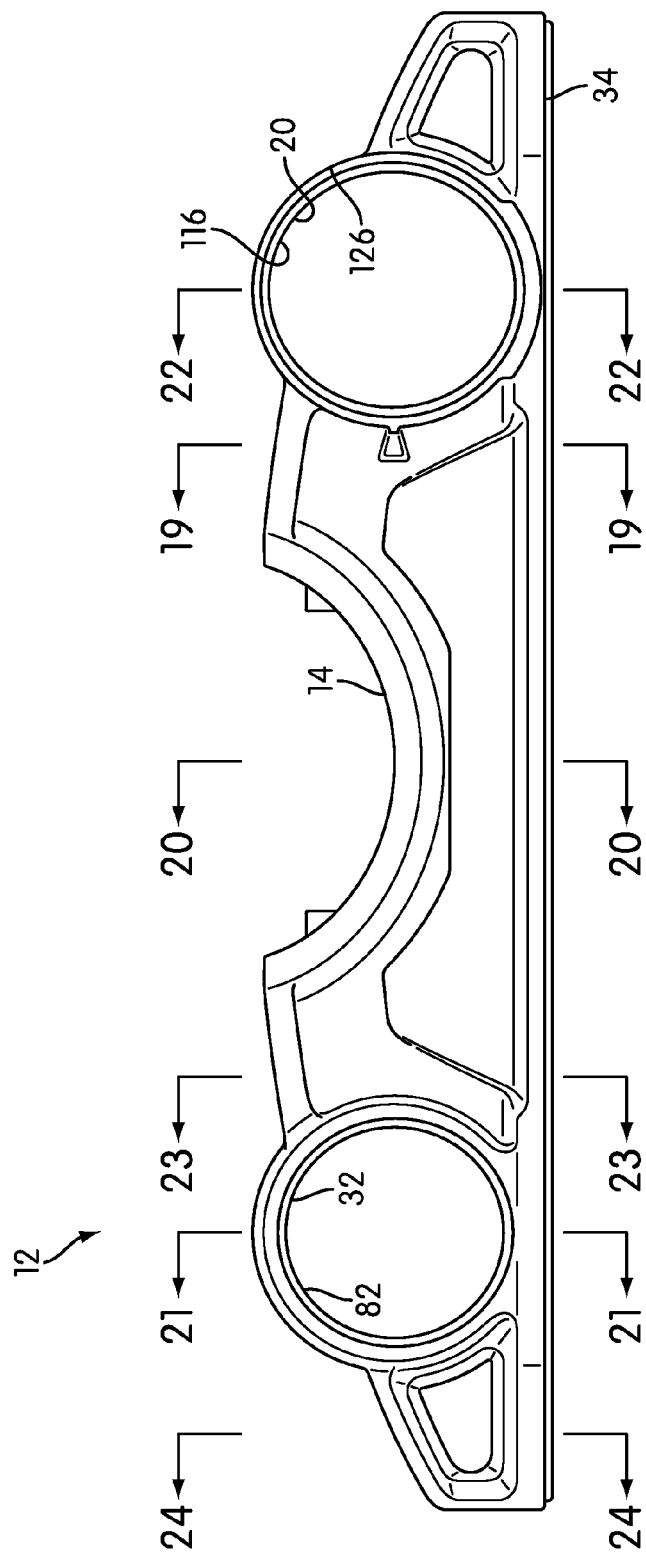
FIG. 14 is a front side view of the level of FIG. 1 as shown in FIG. 13.
Figure 15:
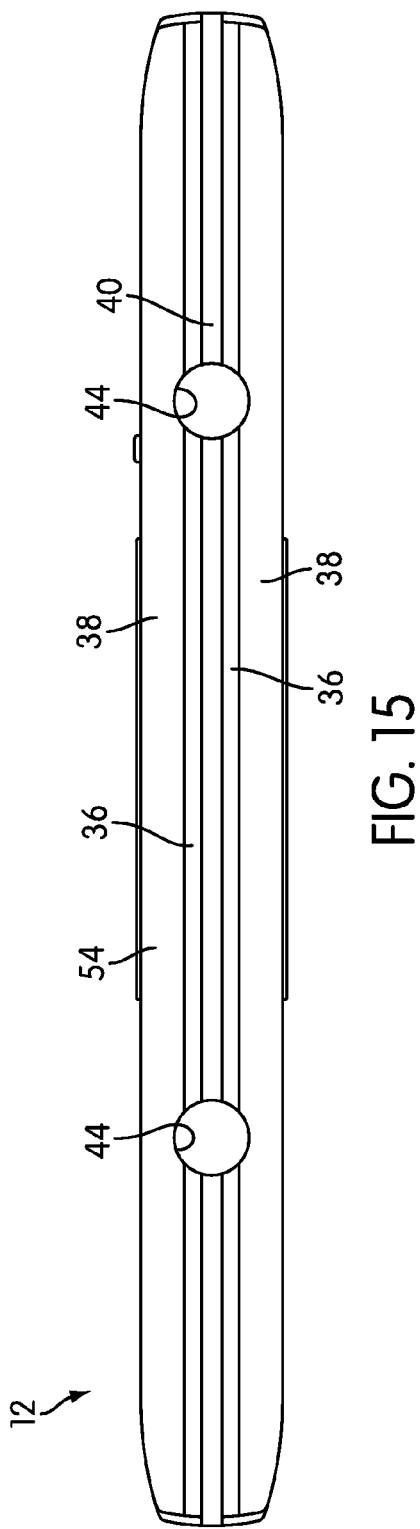
FIG. 15 is a bottom view of the level of FIG. 1 as shown in FIG. 13.
Figure 16:
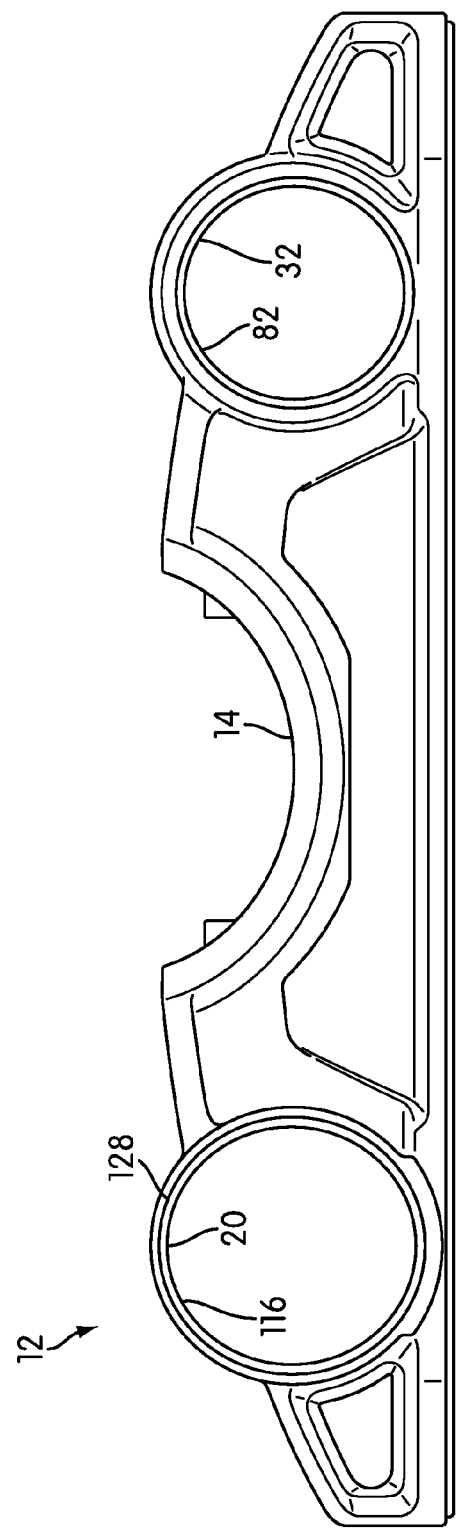
FIG. 16 is a rear side view of the level of FIG. 1 as shown in FIG. 13.
Figure 17:
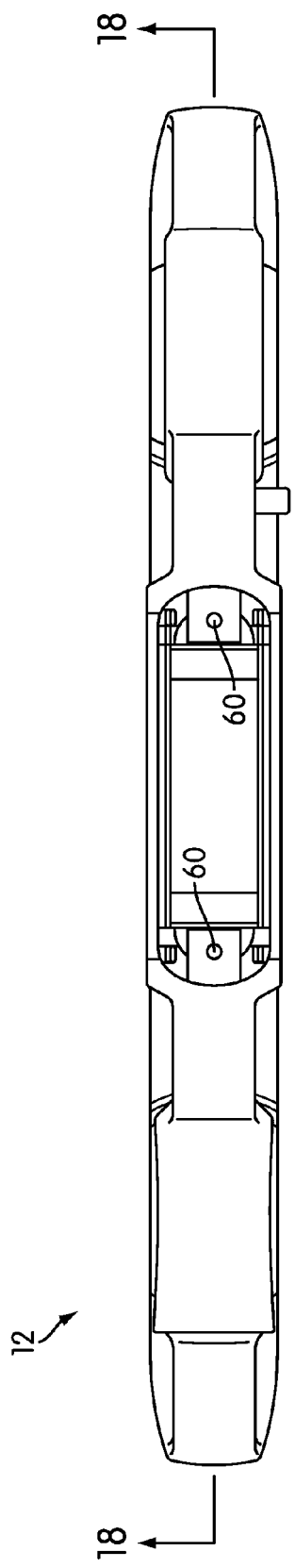
FIG. 17 is a top view of the level of FIG. 1 as shown in FIG. 13.
Figure 18:
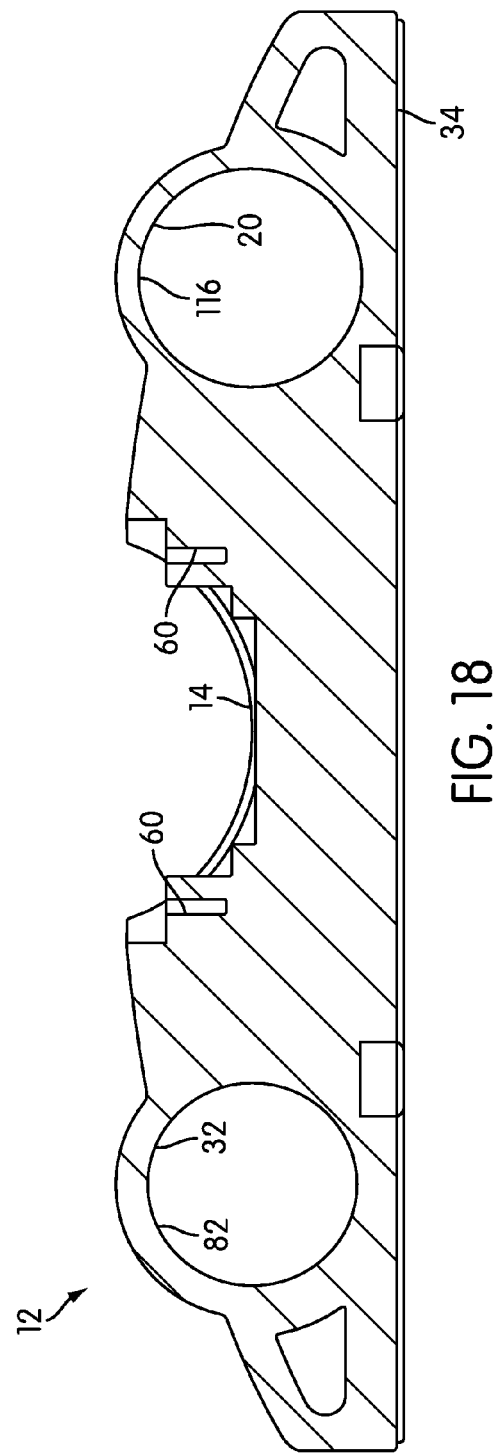
FIG. 18 is a cross-sectional view of the level of FIG. 13 taken along line 18-18 in FIG. 17.
Figure 19:
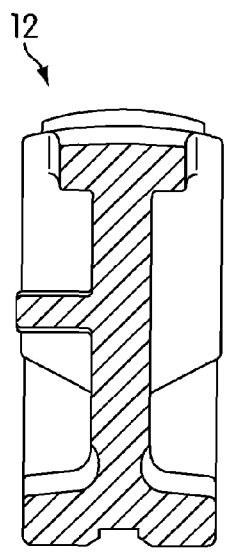
FIG. 19 is a cross-sectional view of the level of FIG. 13 taken along line 19-19 in FIG. 16.
Figure 20:
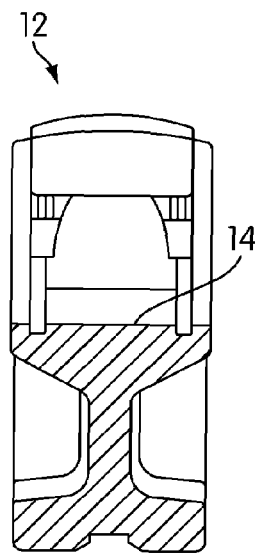
FIG. 20 is a cross-sectional view of the level of FIG. 13 taken along line 20-20 in FIG. 16.
Figure 21:
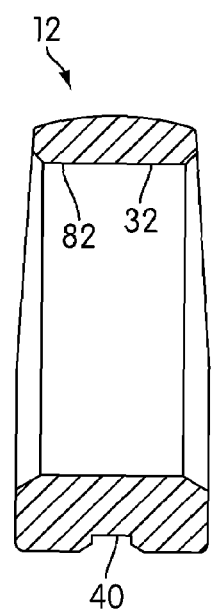
FIG. 21 is a cross-sectional view of the level of FIG. 13 taken along line 21-21 in FIG. 16.
Figure 22:
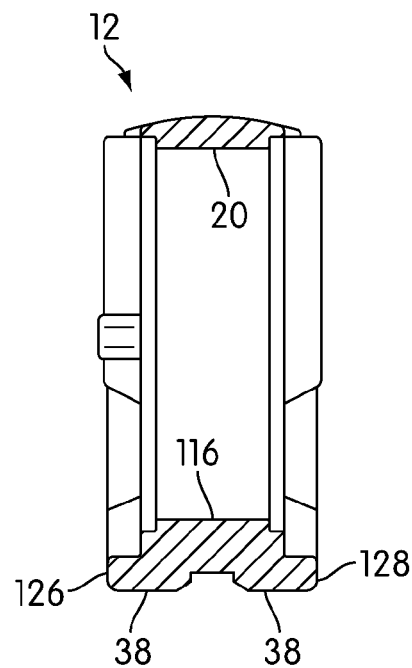
FIG. 22 is a cross-sectional view of the level of FIG. 13 taken along line 22-22 in FIG. 16.
Figure 23:
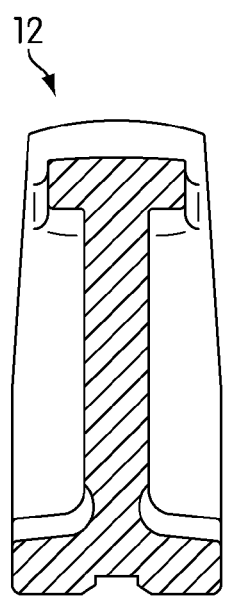
FIG. 23 is a cross-sectional view of the level of FIG. 13 taken along line 23-23 in FIG. 16.
Figure 24:
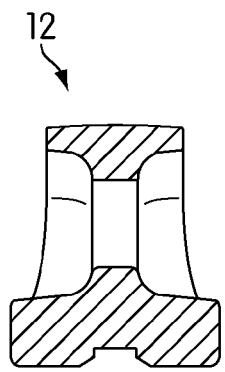
FIG. 24 is a cross-sectional view of the level of FIG. 13 taken along line 24-24 in FIG. 16.

The level body 12 as illustrated in FIGS. 1-24 may be formed from various, appropriate materials, including being molded from a plastic material. As seen in the figures, the level body 12 includes the top recess 14 and two side openings 20 and 32. The level body 12 includes a substantially flat bottom 34, which is placed against the element being measured. As best seen in the cross-sectional view of FIGS. 8-12 and 19-24, the bottom 34, includes a V-shaped surface 36 between two, substantially flat surfaces 38. As described below, the V-shaped surface 36 facilitates the positioning of the bottom 34 against a elongated element 132 with a concave cross-section, such as a pipe or tube, as seen in FIG. 8. Also, a gap 40 is shown as being positioned between the two sides of the V-shaped surfaces 36.

As best seen in FIGS. 4, and 6, the level 10 may include magnets 42, which may be secured to the level body 12 in a variety of ways. Various types and numbers of magnets may be used. In addition, the magnets may take various shapes, forms, and configurations. As seen in the figures, the illustrated level 10 includes two, cylindrical magnets 42, each of which are positioned within a cylindrical hole 44 within the bottom 34 of the level body 12. The magnets 42 do not to interfere with the flatness of the bottom 34 and may be formed as illustrated with a V-shape so as to correspond with the V-shaped surface 36. Thus, the magnets 42 may be formed to be flush with the V-shaped surface 36, or merely correspond in shape with the V-shape surface 36 if desired, to bring the magnets 42 closer to the object to which the magnets are attracted and which is being measured by the level 10 to increase the magnetic force emitted by the magnets 42.

Top vial 16 is configured and arranged to be adjustably secured within top recess 14. Vial 16 includes a sealed enclosure containing an entrapped air bubble floating in a liquid, and is generally formed of transparent material, such as a plastic, to permit a user to easily view the position of the air bubble. As is known in the art, a user may determine whether a surface is sufficiently level by viewing the position of the entrapped air bubble with respect to some markings that are stationary with respect to the level body 12. For example, the vial 16 itself may include a set of markings positioned in a predetermined manner such that when the air bubble is positioned between the markings, it is understood that vial 16 is in a substantially horizontal position. A correspondence or calibration may be made between the vial 16 and the measuring surface, or bottom 34 of level body 12, so that a user knows that when the air bubble of a permanently secured vial is between the markings, the bottom surface 34 of the level 10 is substantially horizontal. Vial 16 is illustrated as having a convex upper surface 50 and a generally flat, rectangular lower surface 52. Specifically, as illustrated, in one embodiment, the vial 16 has a generally cylindrically shaped upper portion 251 and a rectangular box-shaped lower portion 253. The cylindrical upper portion 251 is of a generally half cylinder configuration that is integrally formed with the lower rectangular box-shaped lower portion 253. However, this is exemplary only, and it should be understood that any suitable level or plumb vial can be used. The vial 16 may be formed in a variety of ways. For example, the upper and lower surfaces 52 may be part of an exterior enclosure in which a tubular vial 53 is positioned, or the tubular vial 53 containing the air bubble may be integrally formed with the upper and lower surfaces 50, 52 to form a one-piece, unitary member. One example of a vial for use with the illustrated embodiment is disclosed in U.S. patent application Ser. No. 11/435,723, (identified as PWSP Ref. No. 081427-0324856) filed on May 18, 2006 and titled Level Vial and Manufacturing Method Therefor.

A resilient member 18 may be positioned between the vial 16 and the level body 12 to act as a resilient backer when the vial 16 is secured to the level body 12. As best seen in FIGS. 3-8, in the illustrated embodiment the vial 16 is secured to level body 12 by a cover 54 that is fastened to the level body 12 by fasteners 56, such as screws. The resilient material 18 may take various forms, including a resilient, non-metallic member. In the attached figures, the resilient material 18 is illustrated as a foam that may be shaped as a pad that is positioned between the level body 12 and the vial 16. The foam 18 may be of any appropriate foam material or from any other sufficiently resilient material.

To install the vial 16, the foam 18 is positioned within the recess 14, between the vial 16 and level body 12. The cover 54 is then positioned over the vial 16 and pressed against the vial 16 to force the vial 16 downward, into the foam 18, thus, compressing the foam 18. The cover 54 is fastened to the level body 12 by fasteners, such as a pair of screws 56, which pass through respective openings 58 in cover 54 and into corresponding threaded holes 60 in level body 12. As the screws 56 are tightened and the cover 54 and vial 16 are positioned within the recess 14, the screws 56 and the foam 18 are used to adjust the position of the vial 16. That is, since the foam 18 acts as a resilient backer, once the vial 16 has been sufficiently pressed against the foam 18, the selective turning of the screws permits the vial 16 to be moved further in the inserting direction (downwards in FIG. 6) or in the opposite, removing direction (upwards in FIG. 6). Additionally, one screw 56 may be turned independently of the other screw 56 so that one end of the vial 16 may be moved at a time while the other end of the vial and the other screw 56 remain stationary. Of course the number and types of fasteners 56 may be varied depending upon the level of adjustment desired.

Accordingly, by this method, the position of the vial 16 may be adjusted accurately with respect to the bottom 34 of the level body 12 so that the vial 16 and the air bubble therein and the corresponding markings related thereto accurately indicate when the bottom 34 is substantially horizontal. The adjusting of the vial 16 is, in essence, aligning the longitudinal axis 64 of the vial 16 with the bottom surface 34 of the level body so that the axis 64 and the surface 34 are substantially parallel. If the vial is not accurately positioned, the screws 56 may be turned to adjust the position of the vial 16 into its final position. The vial 16 is then locked into this final position by the locking forces applied by the foam 18 and the screws 56.

Also, a layer or layers of adhesive material may be applied between the vial 16 and the level body 12 so that once the vial 16 has been moved into a final position, the adhesive will cure and further secure the vial 16 in its final position relative to the level body 12. After curing of the adhesive, the vial 16 will be rigidly secured to the level body 12 in its final position. Adhesive may be positioned between the level body 12 and each end of the vial 16. If an adhesive is used and applied between the vial 16 and the level body 12 the adhesive may be applied either after the vial 16 has been positioned into its final position or before or during the adjustment of the vial 16. If the adhesive is applied before or during the adjustment of the vial 16 and before it is in its final position, the adhesive may be selected to remain uncured during the adjustment so as to not interfere with the adjustment of the vial 16 and so that it will not set until after the vial 16 has been moved into its final position. Then, once in its final position, the vial 16 will be further locked into place by the curing of the adhesive. Regardless of the manner of application, the adhesive may ultimately form a rigid interconnection between the vial 16 and the level body 12 to maintain the vial 16 in its final position. Another embodiment may include the use of a viscous, fluid adhesive material that may provide sufficient resiliency to provide a resilient backing for the vial 16 during the adjustment to its final position, and then curing to transform from a viscous fluid to a substantially rigid material that could lock the vial 16 in its final position. For example, the viscous fluid may be in the form of a liquid, curable foam. Also, once the screws 56 are in the final position, fastener covers 62 may be securely positioned over the tops of the screws 56 and within the openings 58 to prevent unintentional turning or loosening of the screws 56. Although, the manner of installing vial 16 has been described with respect to a top vial positioned within top recess 14, the apparatus and methods described are equally applicable for vials positioned anywhere on the level 10, including at the bottom and at the sides.

The illustrated embodiment shown in the figures includes two side vial assemblies 22 and 70. One assembly 22 is rotatable with respect to the level body 12 so that the level 10 can measure angles that are inclined with respect to a horizontal axis. The other assembly 70 is fixed to provide a plumb vial 72, which provides a mechanism for measuring a surface relative to the vertical axis. It should be understood that although the level 10 includes two types of side vials, the level 10 may include any number of rotatable side vial assemblies 22 and/or any number of fixed, plumb vial assemblies 70.

Plumb vial assembly 70 includes a vial 72 that is basically similar to vial 16 in that it too may include a sealed enclosure containing an entrapped air bubble floating in a liquid, and is generally formed of transparent material, such as a plastic, to permit a user to easily view the position of the air bubble. As with the vial 16, vial 72 permits a user to determine whether a surface is sufficiently level by viewing the position of the entrapped air bubble with respect to some markings on the vial 72 or to markings that are otherwise fixed relative to the level body 12. For example, the vial 72 itself may include a set of markings positioned in a predetermined manner such that when the air bubble is positioned between the markings, the vial 72 is considered substantially vertical. The vial 72 may be formed in a variety of way and take various configurations and shapes. For example, the vial 72 may be formed as an insert for positioning between two carriers 74 and 76, as shown. The vial 72 may be part of an exterior enclosure in which a separate, tubular vial (not shown) is positioned, or a tubular vial containing the air bubble may be integrally formed with the vial 72 so that the vial 72 is a one-piece, unitary structure.

As best seen in FIGS. 2, 6, 7, and 10, vial assembly 70 is shown as including a vial 72 that is received within a recess 78 in carrier 74. Carrier 76 is then positioned on carrier 74 to secure the vial 72 within the recess 78. As shown, the carrier 74 may include apertures into which corresponding projections from carrier 76 are inserted to form a friction fit to further secure the carriers 74 and 76 together. The shape of the recess 78 is illustrated as corresponding to the vial 72 so that the vial 72 cannot move relative to the carrier 76. The carriers 74 and 76 together form a substantially circular, convex external surface 80 that fits within the substantially circular, concave internal surface 82 that is formed in level body 12 and forms the second side opening 32. Side opening 32 extends substantially through the level body 12, and the carriers 74 and 76 may be rigidly secured within the side opening 32 by any appropriate manner, such as an adhesive or by mechanical fasteners. The vial 72 may be angularly positioned within the side opening 32 to correspond with the bottom 34 of the level 10 so that a user may determine whether a surface against which the bottom 34 is positioned is vertical. The carriers 74 and 76 and, thus, the vial 72 may rotate within the side opening 32 prior to locking the carriers 74 and 76 and the vial 72 into the final position. Thus, the position of vial 72 may be adjusted after the carriers 74 and 76 are positioned within the opening 32 and prior to being locked into their final position. If an adhesive is used to lock the carriers 74 and 76 into position, the adhesive may be applied after the final adjustments or prior to the final adjustments and prior to the setting of the adhesive. The adjusting of the vial 72 may be considered as an aligning of the longitudinal axis 86 of the vial 72 with the bottom surface 34 of the level body so that the axis 86 and the surface 34 are substantially perpendicular.

The rotatable side vial assembly 22 includes a vial 24 that may be substantially similar to vial 72. Vial 24 is positioned between the two carriers 26 and 28. Carriers 26 and 28 have recesses 90 and 92, respectfully, that are configured to receive vial 24 such that the vial 24 is secured within and moves rigidly with carriers 26 and 28 when the carriers 26 and 28 are rotated about rotational axis 94. The vial 24 is secured within the recesses 90 and 92 by corresponding flanges 94 and 96 of carriers 26 and 28, respectively, when the carriers 26 and 28 are secured to each other by fasteners 96. Fasteners 96 may be threaded fasteners such as screws that extend through openings 98 in carrier 28 and into corresponding threaded holes 100 in carrier 26. The fasteners may have corresponding resilient members 30, such as springs, that apply an opposing force when the carriers 26 and 28 are brought together. For example, as seen in the figures, each fastener 96 may pass through a respective compression spring 30. Each compression spring 30 may be sandwiched between the carriers 26 and 28, within respective recesses 104 and 105 in carrier 26, and in recesses 106 and 107 in carrier 28. Vial assembly 22 may also include a washer 110 positioned between each carrier 26, 28 and the level body 12 to facilitate rotation of the vial assembly 22.

The vial assembly 22 is positioned within the opening 20 in the level body 12 by the sandwiching of the level body 12 between the carriers 26 and 28. That is, each carrier 26 and 28 may be configured to be inserted in the opening 20 from opposing sides of the level body 12. The carriers 26 and 28 together form a pair of substantially circular, convex external surfaces 112 and 114, respectively, that fit within the substantially circular, concave internal surface 116, which is formed in level body 12 and which forms the side opening 32. Side opening 32 extends substantially through the level body 12 and the carriers 26 and 28 may be rotatably secured within the side opening 32 by the sandwiching of the level body 12 between the flanges 118 and 120 extending from the carriers 26 and 28, respectively. The circular flanges 118 and 120 may extend completely around the edges of the side opening 32, as illustrated in the figures. Therefore, the tightening of the fasteners 96 brings the carriers 26 and 28 closer together around the vial 24 while compressing the springs 30. Also, a loosening of the fasteners 96 moves the carriers 26 and 28 further apart, while still maintaining the vial 24 between the carriers 26 and 28 and while maintaining a rigid coupling between the vial 24 and the carriers 26 and 28 in a rotational direction about axis 94. Thus, by the selective tightening of the screws 96, a preferred frictional engagement between the flanges 118 and the level body 12 may be established so that the rotating of the vial assembly 22 about axis 94 can be accomplished with the desired friction to create the desired resistance and "feel" to the user and to provide the desired precision while turning the vial assembly 22. The frictional adjustment of the carriers 26 and 28 also provides a tolerance in adjusting the fit between the vial assembly 22 and the level body 12 if, for example, the level body 12 is slightly wider or slightly thinner due to such things as manufacturing or post manufacturing processes (e.g., painting).

The flanges 118 and 120 may include perforations 122 to assist with the gripping of the vial assembly 22 by the user during rotation. So that the orientation of the vial 24 with respect to the bottom 34 of the level 10 is known to the user, graduations 125 may be placed either on one or both of the flanges 118 and 120 and/or on the edges 126 and 128 of the opening 32. For example, the flanges 118 and 120 may have degree graduations while the edges 126 and 128 have markings to show the vertical and horizontal positions of the axis 130 of the vial 24 with respect to the bottom 34 of the level bottom. Therefore, at any given position of the level 10, a user may rotate the vial assembly 22 until the air bubble in the vial 24 is positioned between the two markings on the vial 24. Then, the user may view the graduations and markings on the flanges 118 and 120 and edges 126 and 128 and determine the angle of the bottom surface 34 relative to the horizontal axis and/or vertical axis. Thus, the user may determine the angular orientation of the measured element to which the level 10 is attached, relative to the horizontal axis or vertical axis. For example, the degree graduations may be from 0 to 360 degrees, or may be smaller graduations, if desired.

Thus, in use as seen in FIGS. 6 and 8, for example, the level 10 may be positioned against an elongated member 132 with a convex, transverse cross-section, such as a pipe, so that the convex, transverse cross-section is positioned within the generally V-shaped cross-sectional recess 36 of the level 10. Additionally, the magnets 42 may releasably fasten the level 10 to the member 132 to facilitate handling of the level 10. Then, the vial assembly 22 may be rotated about its rotational axis 94 to determine the angular orientation of the elongated member 132 relative to the horizontal axis and/or the vertical axis.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

The invention claimed is:
1. A level for measuring, comprising:
a level body having a recess;
a vial positioned within said recess and secured to said level body;
a resilient foam positioned between a lower surface of said vial and an interior surface of said level body to act as a resilient support to said vial; and
a cover configured to engage an upper surface of said vial, said cover being secured to said level body.
2. A level according to claim 1, wherein
said level body has a top and a bottom, said bottom having a generally V-shaped cross-section, and said recess extends through said top.
3. A level according to claim 1, wherein
said resilient foam is formed as a preformed layer that is positioned between said vial and said level body.
4. A level according to claim 1, wherein
said cover is secured to said level body by fasteners.
5. A method of installing a vial in a level, comprising:
positioning a resilient member in an opening in the level on an interior surface of the level;
positioning the vial within the opening while forcing the vial against the resilient member;
engaging a cover with an upper surface of the vial;
securing the cover to the level;
adjusting the position of the vial within the opening by adjusting the cover, wherein the resilient member resiliently accommodates the adjusting; and
securing the vial in the adjusted position.
6. A method according to claim 5, wherein
the positioning the resilient member includes positioning a foam layer within the opening.
7. A method according to claim 5, wherein
the adjusting the position of the vial includes initially securing the cover with a fastener and then adjusting the position of the vial by adjusting the fastener.
8. A method according to claim 5, wherein
the securing the vial includes applying an adhesive within the opening in the level and adjusting the position of the vial before the adhesive sets and secures the vial in the adjusted position.
9. A level for measuring, comprising:
a level body having an opening;
a resilient member positioned in said opening;
a vial having an upper surface and a lower surface, the vial positioned within said opening and the lower surface of the vial forced against said resilient member by a cover configured to contact the upper surface and an adjustable device that is configured to adjust the position of said vial within said opening while said resilient member contacts said vial and resiliently accommodates the adjusting; and
a securing element configured to secure said vial in the adjusted position relative to said level body.
10. A level according to claim 9, wherein
said securing element is an adhesive.
11. A level according to claim 10, wherein
said resilient member is formed from a non-metallic structure.
12. A level according to claim 10, wherein
said resilient member is foam.
13. A level according to claim 10, wherein
said adjustable device is a threaded fastener.

* * * * *